(12) United States Patent
Burnham et al.

(10) Patent No.: US 11,609,554 B2
(45) Date of Patent: Mar. 21, 2023

(54) SCALABLE ANALYTICS SYSTEM

(71) Applicant: Rockwell Automation Technologies, Inc., Mayfield Heights, OH (US)

(72) Inventors: Nancy L. Burnham, Chagrin Falls, OH (US); David J. Wickman, Jr., Mayfield Heights, OH (US); Jonathan D. Walter, Cleveland, OH (US); Lisa D. Hughes, Mayfield Heights, OH (US); Douglas B. Weber, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 74 days.

(21) Appl. No.: 17/038,192

(22) Filed: Sep. 30, 2020

(65) Prior Publication Data
US 2021/0149373 A1 May 20, 2021

Related U.S. Application Data

(60) Provisional application No. 62/937,348, filed on Nov. 19, 2019.

(51) Int. Cl.
*G05B 19/418* (2006.01)
*G06F 16/2457* (2019.01)

(52) U.S. Cl.
CPC ... *G05B 19/4183* (2013.01); *G05B 19/41885* (2013.01); *G06F 16/24573* (2019.01); *G06F 16/24575* (2019.01)

(58) Field of Classification Search
None
See application file for complete search history.

(56) References Cited

U.S. PATENT DOCUMENTS 8,050,801 B2 * 11/2011 Richards ................. F24F 11/30
709/200

FOREIGN PATENT DOCUMENTS

EP 3070547 A2 9/2016
EP 3255590 A1 12/2017

OTHER PUBLICATIONS

European Patent Office, "Communication pursuant to Rule 62 EPC, Extended Search Report", application No. 20182323.4, EPO, dated Feb. 22, 2021, 12 pages.

* cited by examiner

*Primary Examiner* — Carlos R Ortiz Rodriguez
(74) *Attorney, Agent, or Firm* — Quarles & Brady LLP

(57) ABSTRACT

An industrial analytic system includes a device interface component. The device interface component is configured to collect data from a plurality of analytic appliances and transfer the data to an analytic component. Each of the plurality of analytic appliances is configured to collect data from a respective set of devices of a plurality of sets of devices. The plurality of sets of devices perform a plurality of operations in one or more industrial systems.

20 Claims, 14 Drawing Sheets

SCALABLE ANALYTICS SYSTEM

CROSS REFERENCE TO RELATED APPLICATIONS

This application claims priority from and the benefit of U.S. Provisional Application Ser. No. 62/937,348, entitled "SCALABLE ANALYTICS SYSTEM," filed Nov. 19, 2019. This U.S. Provisional Application is hereby incorporated by reference in its entirety for all purposes.

BACKGROUND

The subject matter disclosed herein relates generally to industrial automation systems, and, more particularly, to industrial data analytics.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one embodiment, an industrial analytic system includes a device interface component. The device interface component is configured to collect data from a plurality of analytic appliances and transfer the data to an analytic component. Each of the plurality of analytic appliances is configured to collect data from a respective set of devices of a plurality of sets of devices. The plurality of sets of devices perform a plurality of operations in one or more industrial systems.

In another embodiment, a method includes: collecting, by one or more processors, first analytic data from a first analytic appliance, the first analytic data comprising analytics of a first set of devices; collecting, by the one or more processors, second analytic data from a second analytic appliance, the second analytic data comprising analytics of a second set of devices; combining, by the one or more processors, the first analytic data and the second analytic data; and transferring the combined analytic data to an analysis system.

In another embodiment, a non-transitory computer-readable medium having stored thereon instructions that, in response to execution, cause a system comprising a processor to perform operations, the operations comprising: collecting first analytic data from a first analytic appliance, the first analytic data comprising analytics of a first set of devices; collecting second analytic data from a second analytic appliance, the second analytic data comprising analytics of a second set of devices; combining the first analytic data and the second analytic data; and transferring the combined analytic data to an analysis system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
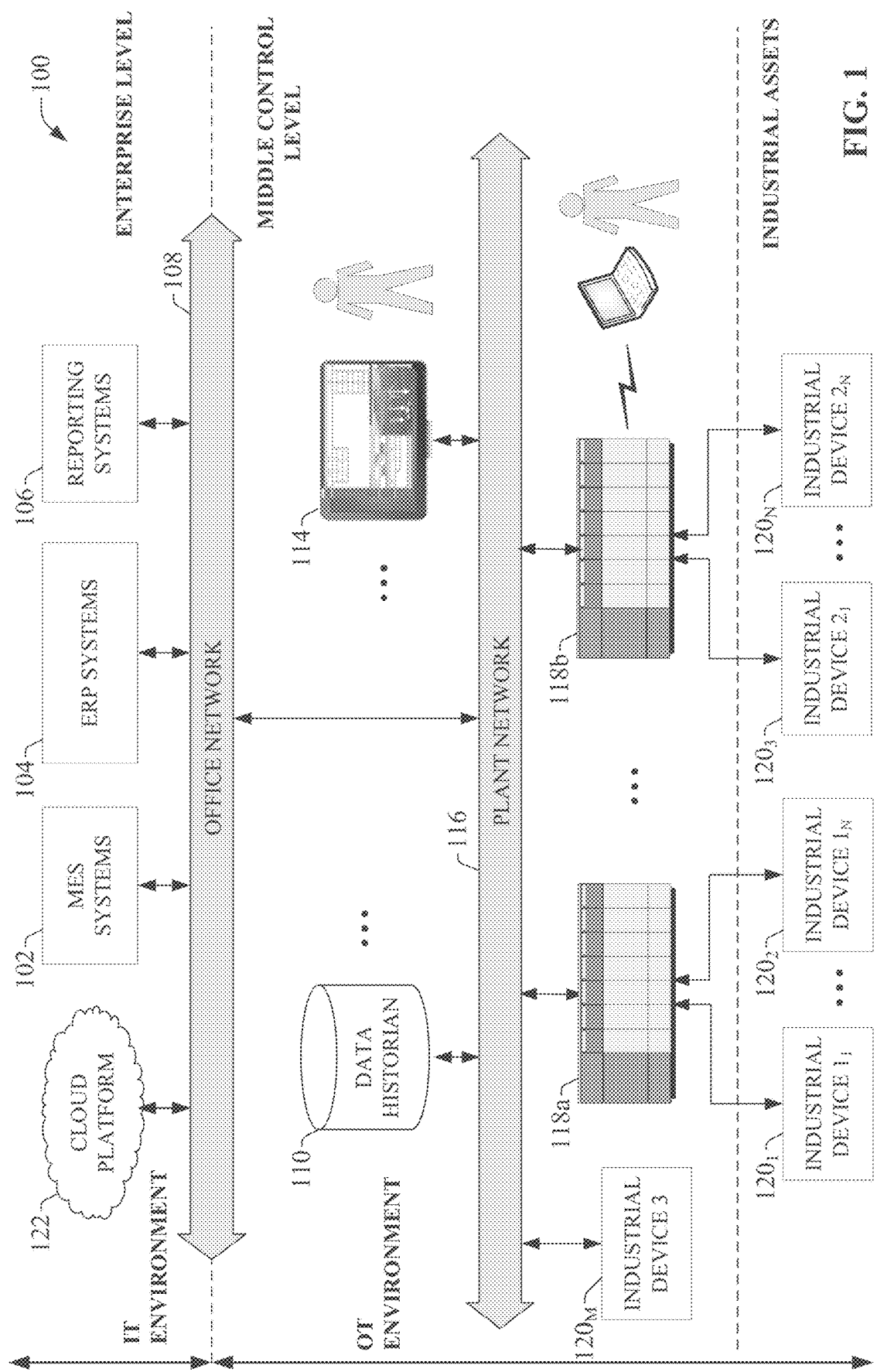
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, C++, Python, Javascript, or other such platforms.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

These diverse information sources are spread across many locations and systems within the plant environment. When diagnosing problems or determining the status of a machine or automation system, maintenance personnel are typically required to search several of these sources of information individually, often using several different software packages specific to the respective data sources being searched. Moreover, searching for information pertaining to a particular device or machine often requires an extensive knowledge of the overall industrial system in order to locate the data source to be searched (e.g., industrial controllers, HMIs, etc.), as well as to identify the relevant operator screens or control program routines. Individually searching each of these data sources in connection with solving a system downtime issue or ascertaining the health of an automation system or device can delay correction of maintenance issues, resulting in lost revenue and scheduling problems. Locating and acquiring relevant system data is also rendered more difficult by the non-intuitive nature of the applications used to present the data to the user (e.g., HMI displays, industrial controller program development and monitoring software, etc.). These applications may not be easily understood by users who have not been trained to navigate applications' features.

To address these and other issues, one or more embodiments described herein provide a device-level analytics and reporting system that can be used independently or in conjunction with a larger scalable analytics system to monitor and proactively report on the health and status of the automation systems that make up an industrial enterprise.

Figure 2:
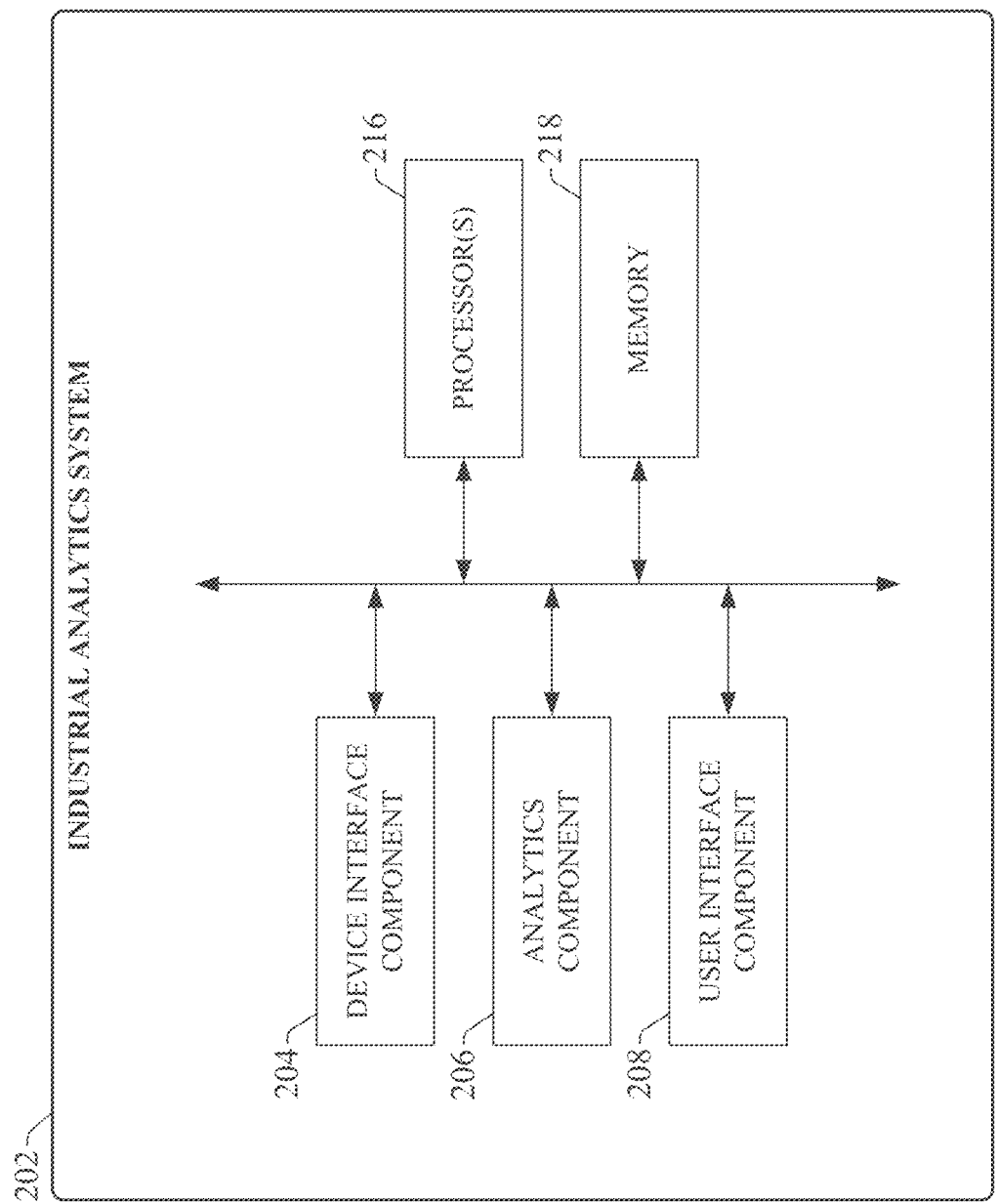
FIG. 2 is a block diagram of an example industrial analytics system.

FIG. 2 is a block diagram of an example industrial analytics system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial analytics system 202 can include a device interface component 204, an analytics component 206, a user interface component 208, one or more processors 216, and memory 218. In various embodiments, one or more of the a device interface component 204, an analytics component 206, a user interface component 208, the one or more processors 216, and memory 218 can be electrically and/or communicatively coupled to one another to perform one or more of the functions of the industrial analytic system 202. In some embodiments, components 204, 206, and 208, can comprise software instructions stored on memory 218 and executed by processor(s) 216. Industrial analytics system 202 may also interact with other hardware and/or software components not depicted in FIG. 2. For example, processor(s) 216 may interact with one or more external user interface devices, such as a keyboard, a mouse, a display monitor, a touchscreen, or other such interface devices. In some embodiments, smart gateway platform 302 can serve as a logical entity that is embedded in another device, including but not limited to an edge device, an industrial controller, or an HMI terminal. Alternatively, industrial analytics system 202 can be embodied on an appliance configured to reside on a plant network 116 or an office network 108. In some embodiments, industrial analytics system 202 may reside on a cloud platform and execute as a set of cloud-based services.

Device interface component 204 can be configured to exchange information between the industrial analytics system 202 and sources of industrial data at one or more plant facilities. Sources of industrial data that can be accessed by the device interface component 204 can include, but are not limited to, industrial controllers, telemetry devices, motor drives, quality check systems (e.g., vision systems or other quality verification systems), industrial safety systems, cameras or other types of optical sensors, data collection devices (e.g., industrial data historians), or other such information sources. These industrial data sources can comprise devices of different types and vendors, and include sources of both structured and unstructured data. In some embodiments, device interface component 204 can exchange data with these industrial devices via the plant networks (e.g., plant network 116) on which the devices reside. Device interface component 204 can also receive at least some of the industrial data via a public network such as the Internet in some embodiments. The device interface component 204 can directly access the data generated by these industrial devices and systems via the one or more public and/or private networks in some embodiments. Alternatively, device interface component 204 can access the data on these data sources via a proxy or edge device that aggregates the data from multiple industrial devices for migration to the analytics system 202 via the device interface component 204.

Analytics component 206 can be configured to perform local analytics (e.g., AI, machine learning, statistical analysis, etc.) on the modeled industrial data. User interface component 208 can be configured to exchange information between the industrial analytics system 202 and a client device having authorization to access the platform. In some embodiments, user interface component 208 can be configured to generate and deliver graphical dashboards or other types of interface displays to the client device. These dashboards can render selected subsets of the collected industrial data, selected analytic results, or other information relative to a selected context or category of desired information. The user interface component 208 can deliver analytic results to the client device via the dashboards, including notifications of predicted asset performance issues, recommendations for achieving a specified operational or business objective, or other such analytic outputs.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
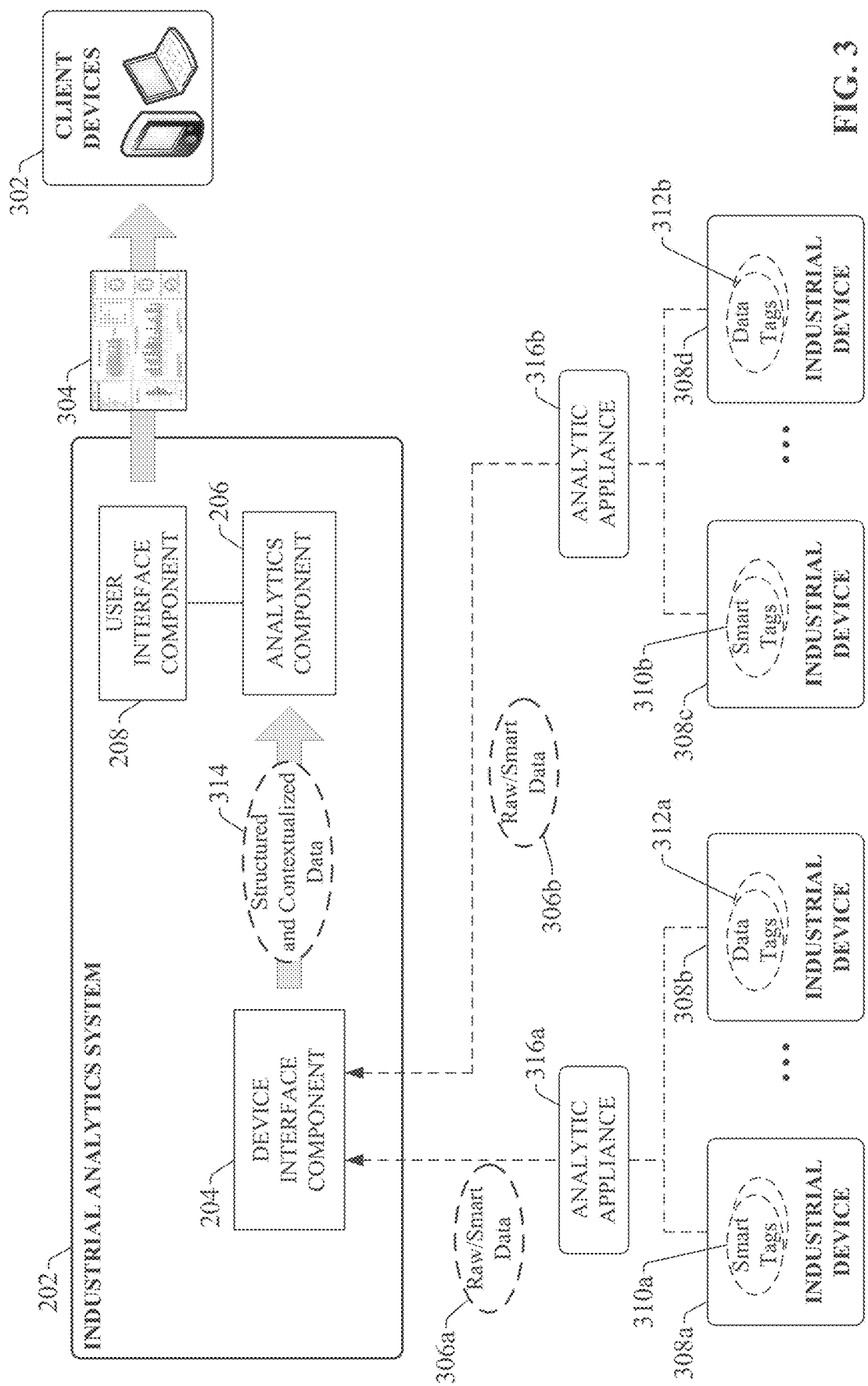
FIG. 3 is a diagram illustrating an example architecture in which an industrial analytics system collects raw and/or smart data from industrial devices that make up one or more automation systems of an industrial enterprise.

FIG. 3 is a diagram illustrating an example architecture in which industrial analytics system 202 collects raw and/or smart data 306 from industrial devices 308 that make up one or more automation systems of an industrial enterprise. In some configurations, industrial analytics system 202 receives raw and/or smart data 306 from analytic appliances 316 installed at or near respective automation systems and which collect data from the industrial devices 308 making up those automation systems. In the illustrated example, a first analytic appliance 316 collects and delivers data 308a from a first set of industrial devices 308 (including devices 308a and 308b) that make up a first automation system or machine, while a second analytic appliance 316b collects data 306 from a second set of industrial devices 308 (including 308c and 308d) that make up a second automation system or machine. In some implementations, system 202 may comprise an appliance that resides on plant network 116 or office network 108 and collects data 308 from the analytic appliances 316, which also reside on the common network. In some embodiments, system 202 can automatically discover the sources of data 306 (e.g., analytic appliances 316) and configure the device interface component 204 to begin collecting this data 306 from the discovered sources.

Some of the industrial devices 308 (e.g., devices 308a and 308c) may be smart devices which store their device data in smart tags 310. Each smart tag 310 can store both the value of its corresponding data item—e.g., a telemetry value (speed, flow, pressure, etc.), a status of a safety device, a state of a valve or actuator, etc.—as well as contextual metadata that provides additional information about the value. Other industrial devices 308 (e.g., devices 308b and 308d) may store their associated data values is standard data tags 312 as raw data.

In some embodiments, the system's device interface component 204 can contextualize, model, and structure raw and/or smart data 306 collected from analytic appliances 308 in accordance with one or more analytics models. The resulting structured and contextualized data 314 is then passed to analytic component 206 for analysis (e.g., AI analysis, machine learning analysis, etc.). User interface component 208 delivers results of this real-time monitoring and analytics to selected client devices 302 via dashboards 304 that render custom presentations of the data in meaningful ways.

Figure 4:
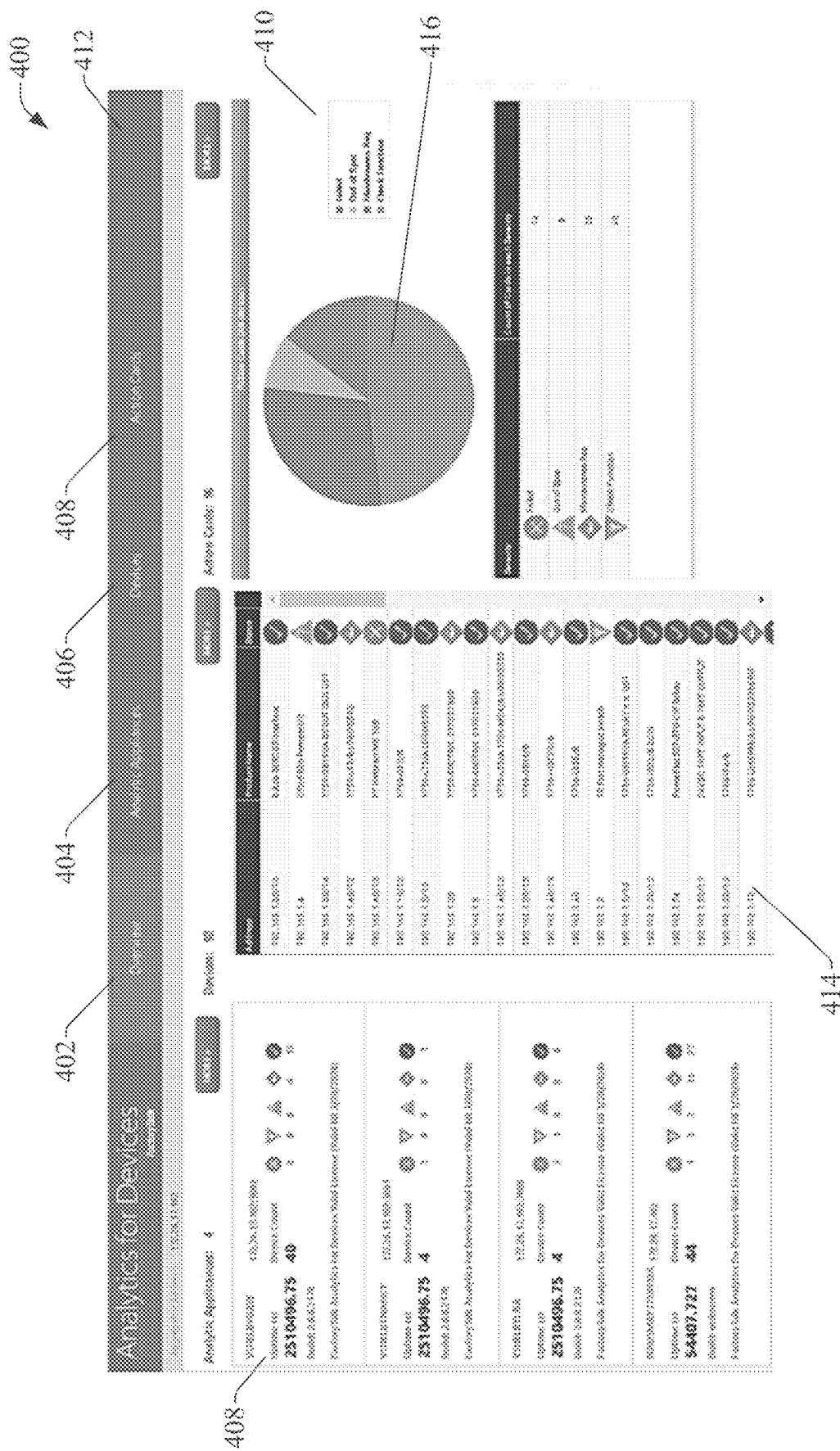
FIG. 4 is an example Overview dashboard that can be generated by a user interface component of an industrial analytics system.

FIG. 4 is an example Overview dashboard 400 that can be generated by the user interface component 208 according to one or more embodiments. In this example, dashboard 400 comprises a navigation toolbar 412 with four selectable navigation buttons 402, 404, 406, and 408 that allow the user to transition between dashboard categories. The example Overview dashboard 400 depicted in FIG. 4 comprises a set of analytic appliance modules 408 along the left side of the dashboard 400. These modules 408 render summary information for the industrial systems corresponding to the respective analytic appliances 316. In general, a given analytic appliance 316 collects data from a set of industrial assets that are to be viewed as a collective entity for analytic purposes. Example information that can be rendered in an analytic application module 408 can include, but is not limited to, a total uptime or runtime for the corresponding automation system, the number of devices that make up the automation system (e.g. a number of automation devices connected to the corresponding analytic appliance 316), the number of devices that are currently in each of a number of possible states (e.g., normal, faulted, warning, etc.), a license status for the analytic appliance, or other such summary information.

Overview dashboard 400 can also include a device list 414 that lists of the devices that make up the collected automation systems, together with the name and current status of each device. On the right side of the Overview dashboard 400 is an action card section 410 that summarizes the currently active action cards generated by the analytic system 202. Action cards are generated by the system 202 in response to detection of an issue by the analytics component 206, based on analysis of the structured and contextualized data 314. Each action card renders summary data for the detected issue, allowing a user to determine a suitable corrective action to address the issue. In general, action cards can be categorized according to severities of the issues (e.g., Failed, Out of Spec, Maintenance Request, and Check Function). The action card section 410 of the Overview dashboard 400 renders total numbers active action cards for each severity, in both numeric format and as a pie chart 416.

Figure 5:
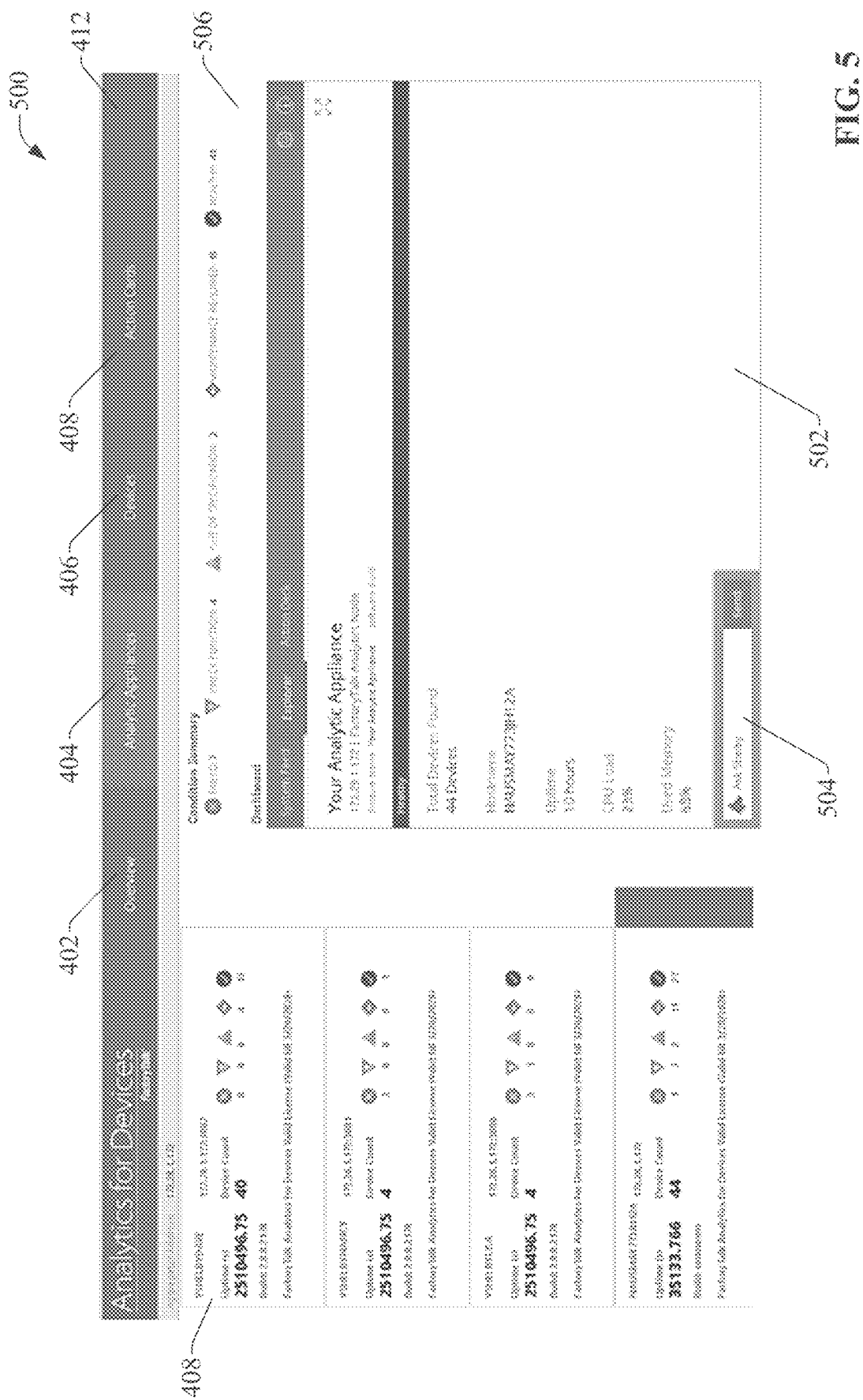
FIG. 5 is an example Analytic Appliance dashboard that can be generated by a user interface component of an industrial analytics system.

Selection of the Analytic Appliance button 404 from the toolbar 412 causes the Analytic Appliance dashboard to be rendered. FIG. 5 is an example Analytic Appliance dashboard 500 that can be generated by the user interface component 208 according to one or more embodiments. The Analytic Appliance dashboard 500 maintains the analytic appliance modules 408 on the left side of the dashboard 500, while rendering an analytic appliance detail panel 502 on the main canvas of the dashboard 500. Selection of one of the analytic appliance modules 408 causes the detail panel 502 for the corresponding analytic appliance 316 to be rendered. The analytic appliance detail panel 502 for an analytic appliance 502 can include such information as a user-defined name of the appliance, a total number of devices 308 that are connected to the analytic appliance 316, a total uptime for the automation system corresponding to the analytic appliance 316, a processing load on the analytic appliance's central processing unit (CPU), a total memory usage for the analytic appliance 316. The panel 502 can also include a condition summary 506 listing a number of possible device conditions (e.g., Failed, Check Function, Out of Specification, Maintenance Required, and Health) and a total number of devices connected to the analytic appliance 316 that are currently in each respective device state.

In some embodiments, the analytic appliance panel 502 can also include a help field 504 through which a user can request automated assistance additional troubleshooting information. Requests for troubleshooting information can be submitted to the help field 504 either by entering a plain-language request using a peripheral device (e.g., a keyboard or touchpad) or may be entered by speaking into a microphone integrated with the client device 302 on which the dashboard is rendered. These requests are sent back to the system 202 and translated by the user interface component 206 so that the user's request can be interpreted and a suitable response formulated.

Figure 6:
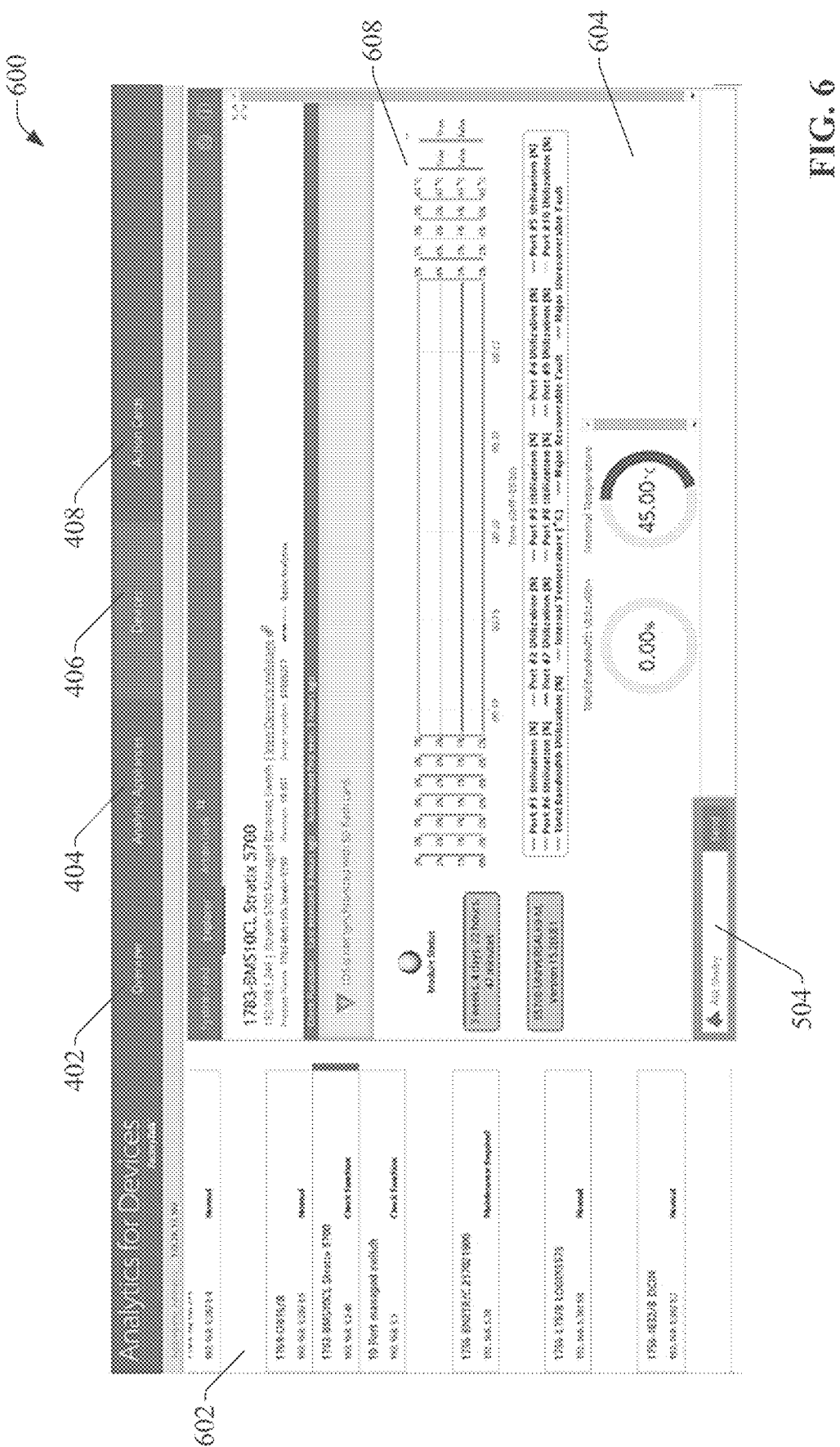
FIG. 6 is an example Devices dashboard that can be generated by a user interface component of an industrial analytics system.

Selection of the Devices button 406 from the toolbar 412 causes the Devices dashboard to be rendered. FIG. 6 is an example Devices dashboard 600 that can be generated by the user interface component 208 according to one or more embodiments. In this example, devices dashboard 600 renders a device list 602 on one side, which lists the devices that are connected to the analytic appliances 316. Selection of one of the devices from the list 602 causes a device panel 604 for the selected device to be displayed on the dashboard's main canvas. The device panel 604 renders information for the selected device, including but not limited to the name of the device, a revision number and serial number for the device, a product type of the device, a total amount of time that the device has been in service. In general, the items of information rendered for a given device depends on the type of the device. For example, selection of a managed ethernet switch from the device list 602 can render information specific to that device, such as a total bandwidth utilization, an internal device temperature, a port utilization percentage over time for each of the switch's ports (which may be rendered as a time-series line graph 608), or other such information.

Figure 7:
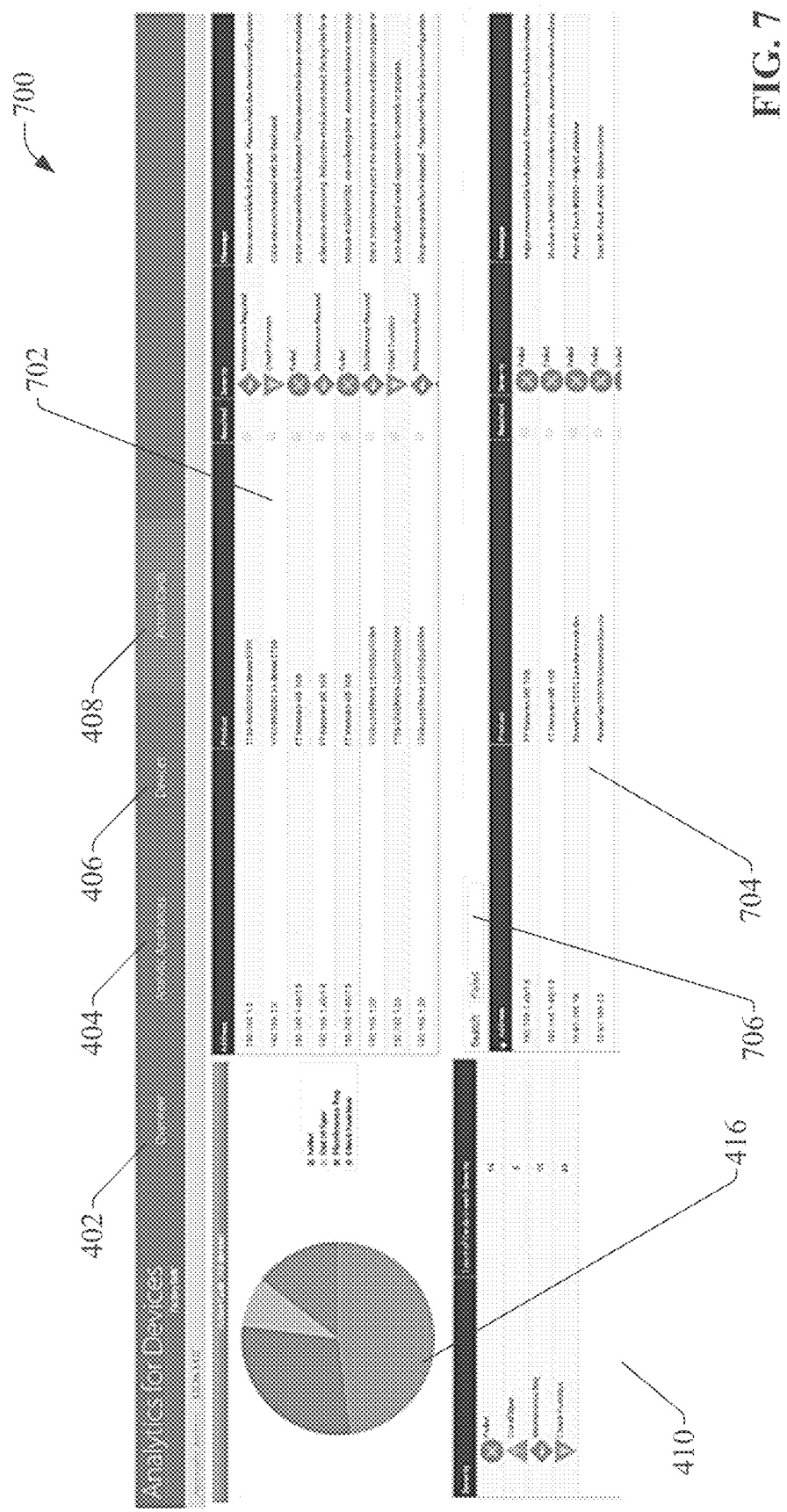
FIG. 7 is an example Action Cards dashboard that can be generated by a user interface component of an industrial analytics system.

Selection of the Action Cards button 408 from the toolbar 412 causes the Action Cards dashboard to be rendered. FIG. 7 is an example Action Cards dashboard 700 that can be generated by the user interface component 208 according to one or more embodiments. The Action Cards dashboard 700 maintains the action card section 410 from the Overview dashboard 400 as a summary of the currently active action cards, while the individual action cards that are currently active are listed in an action card list 702 on the main canvas of the dashboard 700. As noted above, each action card represents an issue affecting a device of one of the automation systems being monitored that may require attention by appropriate plant personnel. Each action card entry on the list 702 can include the network address of the device to which the issue pertains, a type of the device (e.g., in terms of the device's model, serial number, vendor, and/or product name), a severity of the issue (e.g., Failed, Out of Spec, Maintenance Required, Check Function, etc.), and a message describing the issue. The action card entries may also include a checkbox that can be set by the user when the issue has been resolved. Selection of an entry from the action card list 702 can cause the system 202 to render a window including additional detail regarding the corresponding issue.

In some cases, if the system 202 has information regarding a solution to the issue, the message may also include instructions for addressing the issue. For example, action cards having a Maintenance Required severity may specify both the problem as well as a possible solution. An example Maintenance Required action card may indicate that a minor recoverable fault has been detected on a specified device, and instruct the user to check the device's configuration for additional information. In another example, an action card may indicate that a service that should be running on a specified device is not running, and instruct the user to reboot the device and check the device's log files for further information.

In some embodiments, the Action Card dashboard 700 can also include a search section 704 that allows the user to search for a subset of active action cards according to a specified criterion. The search section can include an action card search field 706 that allows the user to enter an action card search criterion. In response to entering the search criterion, the user interface component 208 renders the subset of active action cards that match the criterion in the search section 704. In the illustrated example, the user has entered a search for all active action cards having a Failed severity.

Figure 8:
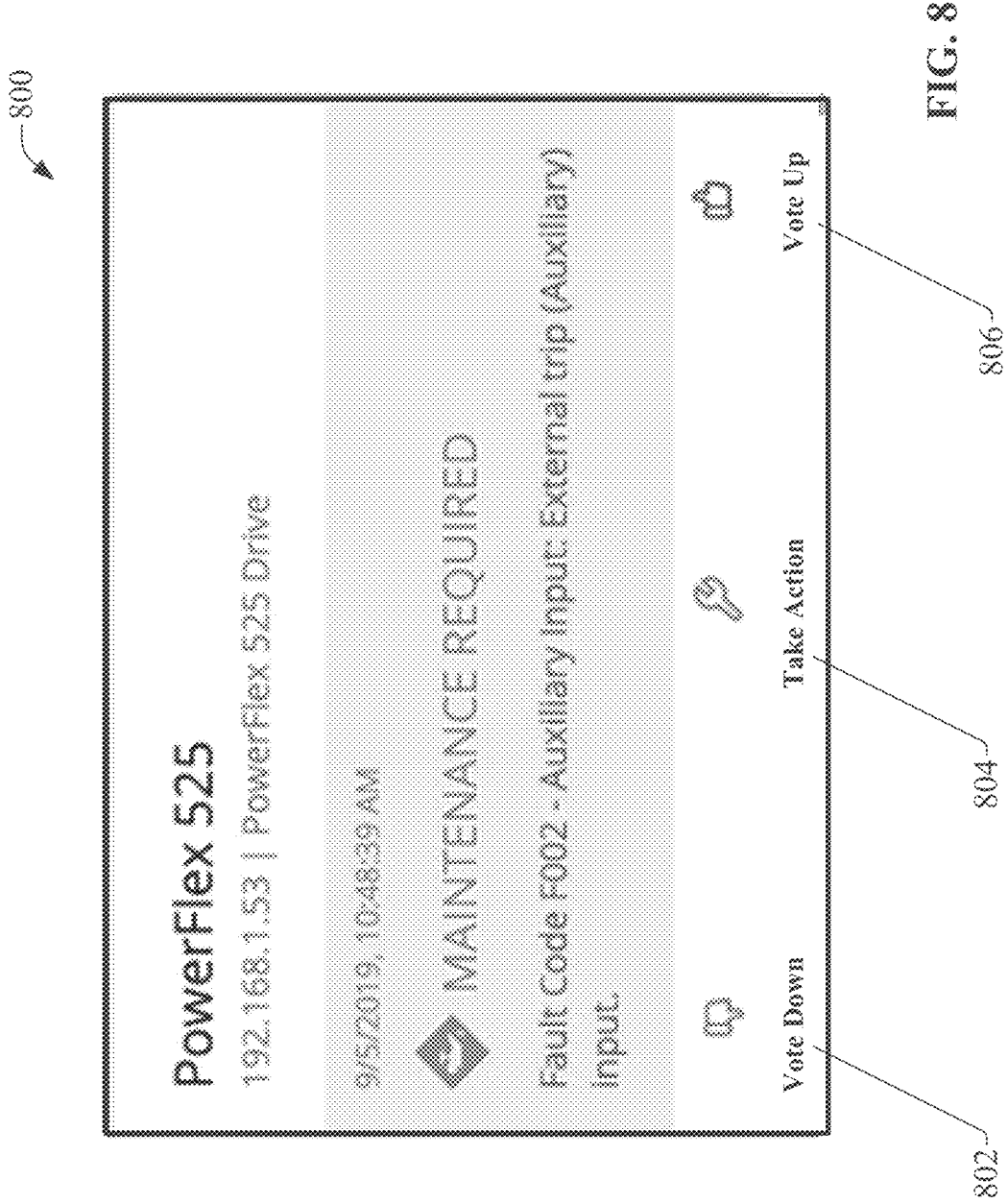
FIG. 8 is an example action card window that can be invoked in response to selection of an action card from an action card list.
Figure 9:
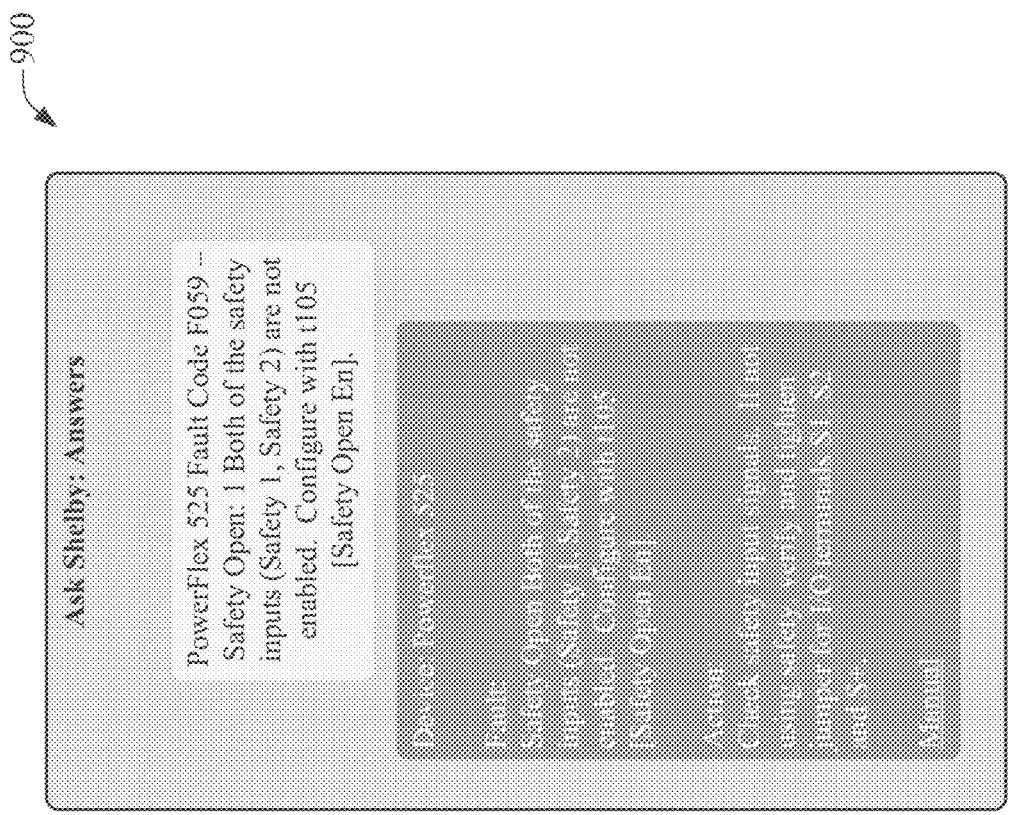
FIG. 9 is an example Take Action window that can be invoked in response to selection of a Take Action button.

FIG. 8 is an example action card window 800 that can be invoked in response to selection of an action card from the list 702. In some embodiments, an action card window 800 can render information regarding the affected device, the severity of the issue, and specifics regarding the issue (e.g., Auxiliary Input: External Trip input). The window 800 can also include a Take Action button 804 that, in response to selection, invokes a window describing the issue in more detail and outlining a proposed solution. FIG. 9 is an example Take Action window 900 that can be invoked in response to selection of the Take Action button 804. A similar window 900 may also be invoked using the help field 504.

Returning to FIG. 8, action card window 800 may also include a Vote Down button 802 and a Vote Up 806 button. These buttons allow users to register their opinions regarding the importance or priority of the corresponding issue; e.g., whether they believe the issue should be resolved soon (the Vote Up button 806), or whether the issue should be deprioritized in favor of more important issues (the Vote Down button 802). The total numbers of Up and Down votes for a given issue can be rendered on window 800 and/or on the issue's entry on the action card list 702. Also, in some embodiments, the numbers of Up and Down votes for a given issue can determine the issue's placement on the action card list 702, such that issues having greater numbers of Up votes are placed higher on the list 702.

Figure 10:
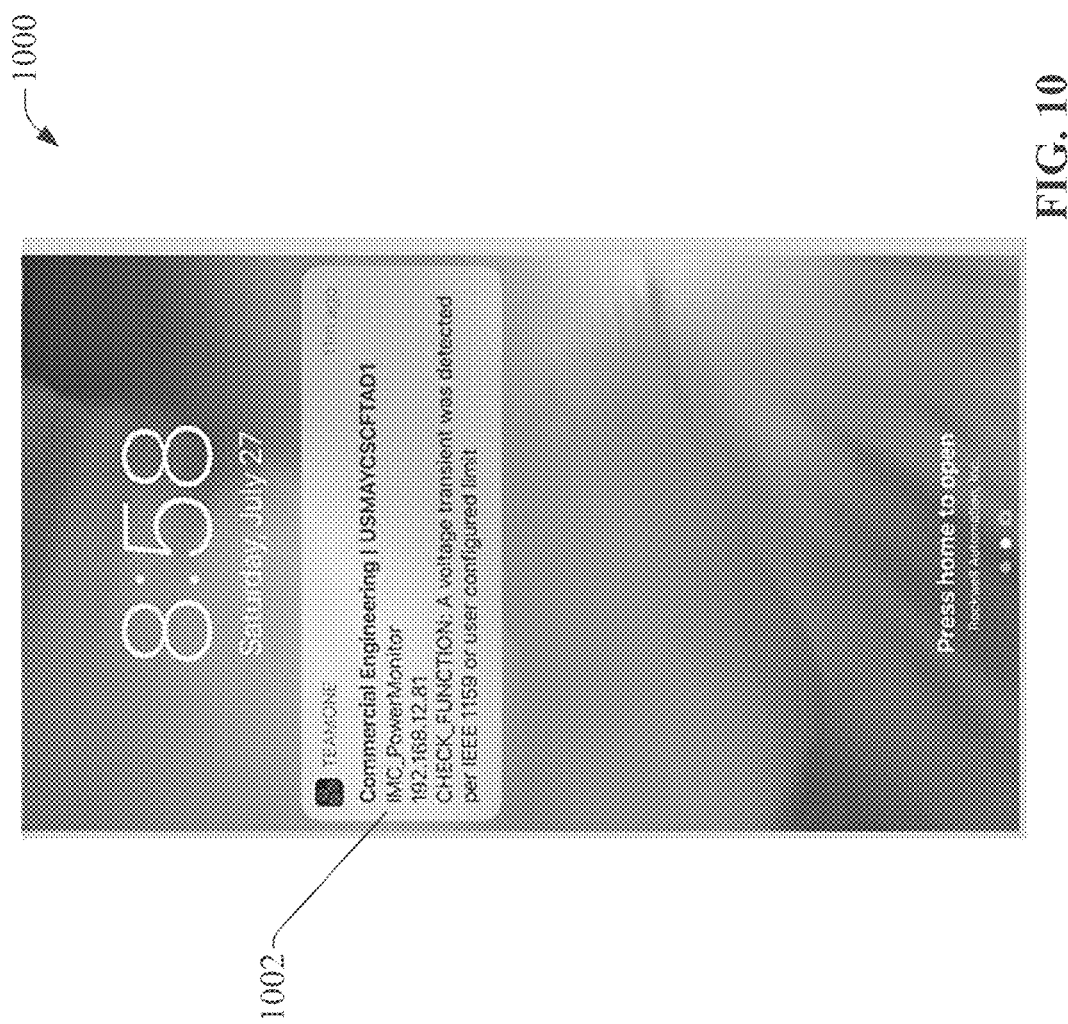
FIG. 10 is a screenshot of a mobile phone home screen on which an action card notification has been rendered.

Some embodiments of industrial analytic system 202 can support interactions with mobile phones. In such embodiments, user interface component 208 can be configured to push action card notifications as text messages to selected mobile phones associated with appropriate plant personnel. FIG. 10 is a screenshot of a mobile phone home screen 1000 on which an action card notification has been rendered.

Figure 11:
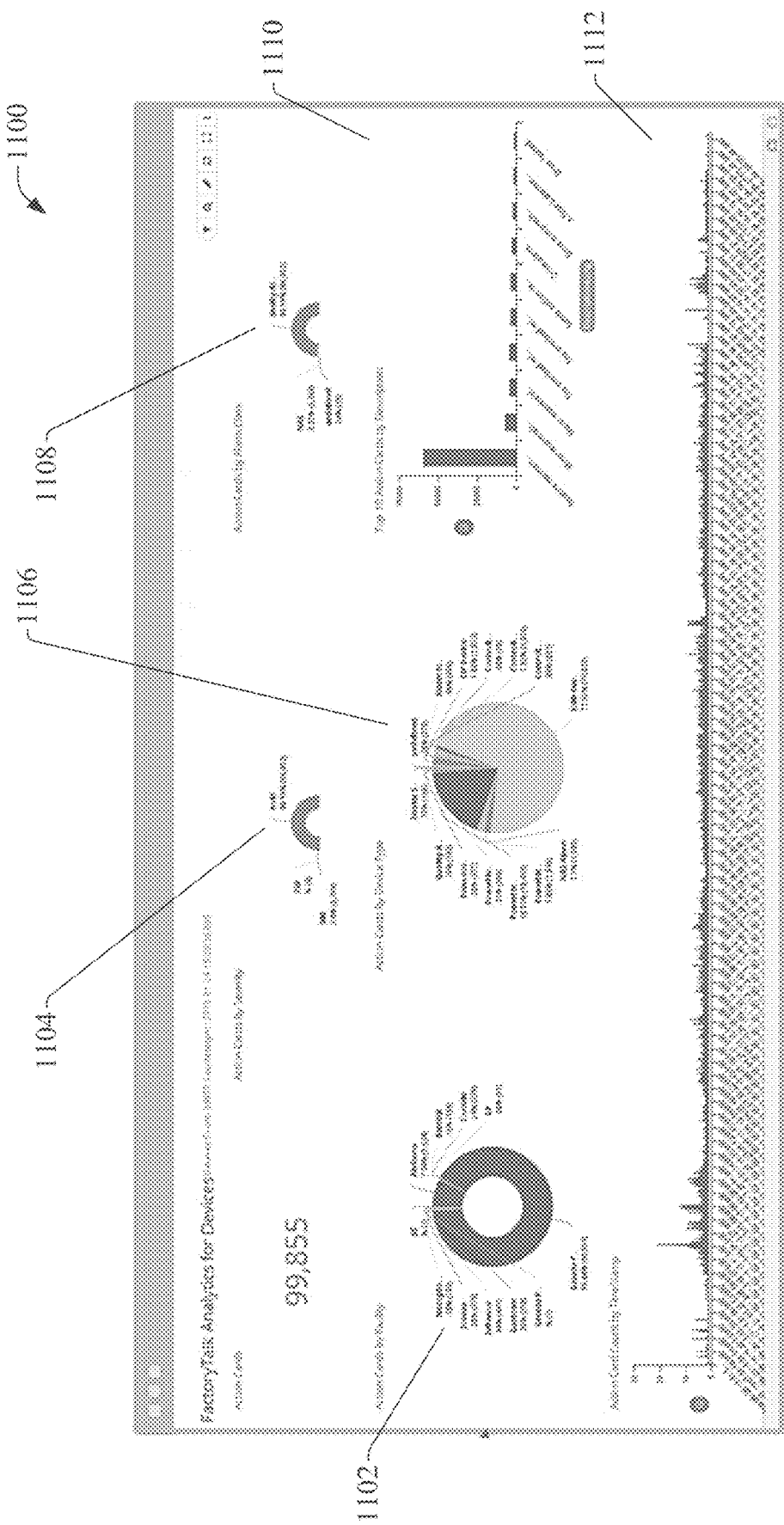
FIG. 11 is an example Action Card Summary screen.

FIG. 11 is an example action card summary screen 1100 that can be rendered by the user interface component 208 in some embodiments. Action card summary screen 1100 can include a graphic 1102 that indicates the relative numbers of action cards (corresponding to the number of detected issues) according to industrial facility, a graphic 1106 indicating the relative numbers of action cards according to device type, a bar chart 1110 indicating the top ten action cards according to description and the numbers of action cards for each description, a graphic 1104 indicating relative numbers of action cards according to severity, a graphic 1108 indicating relative numbers of action cards according to alarm class, and a time-series chart 1112 indicating numbers of action cards by time stamp.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
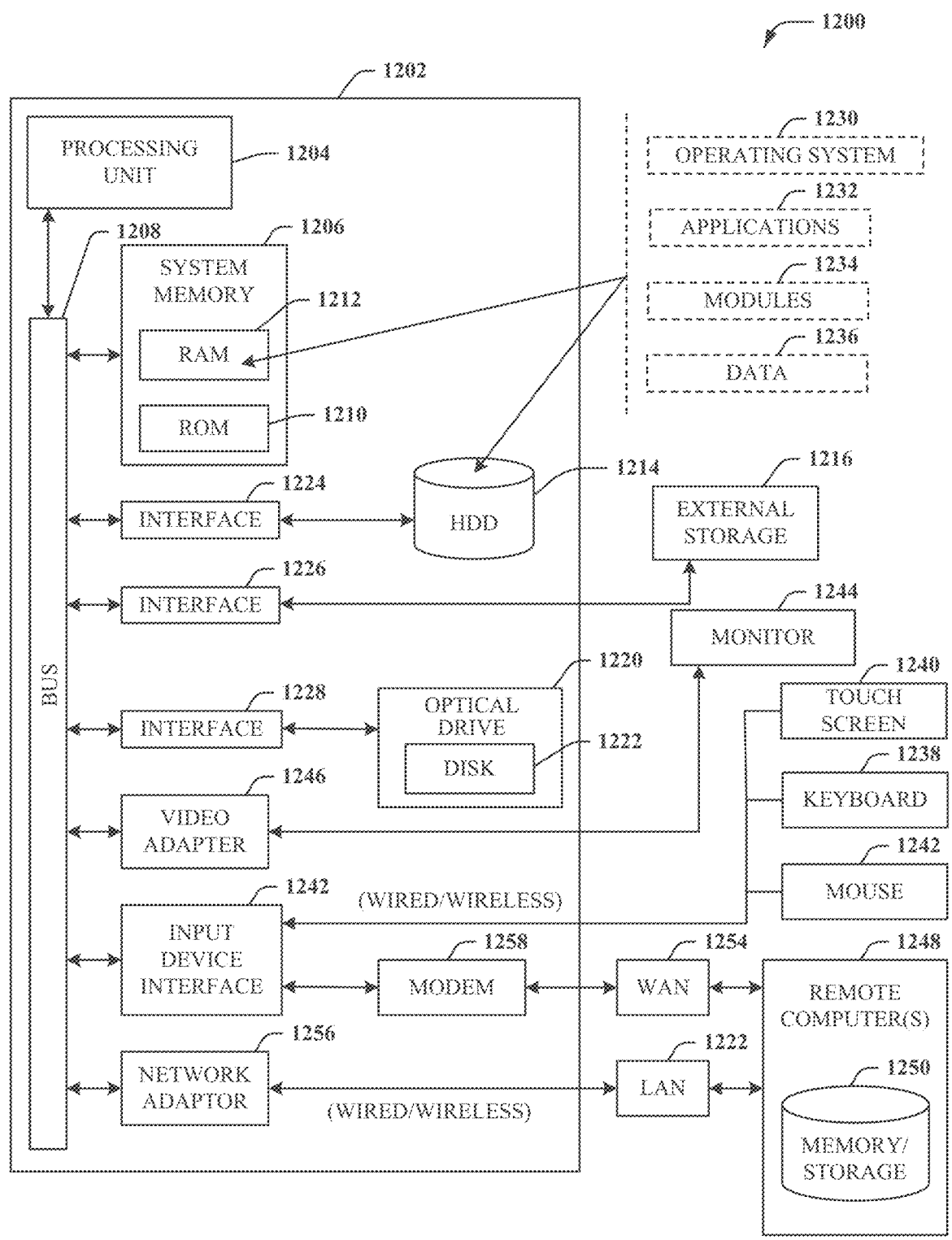
FIG. 12 is an example computing environment.
Figure 13:
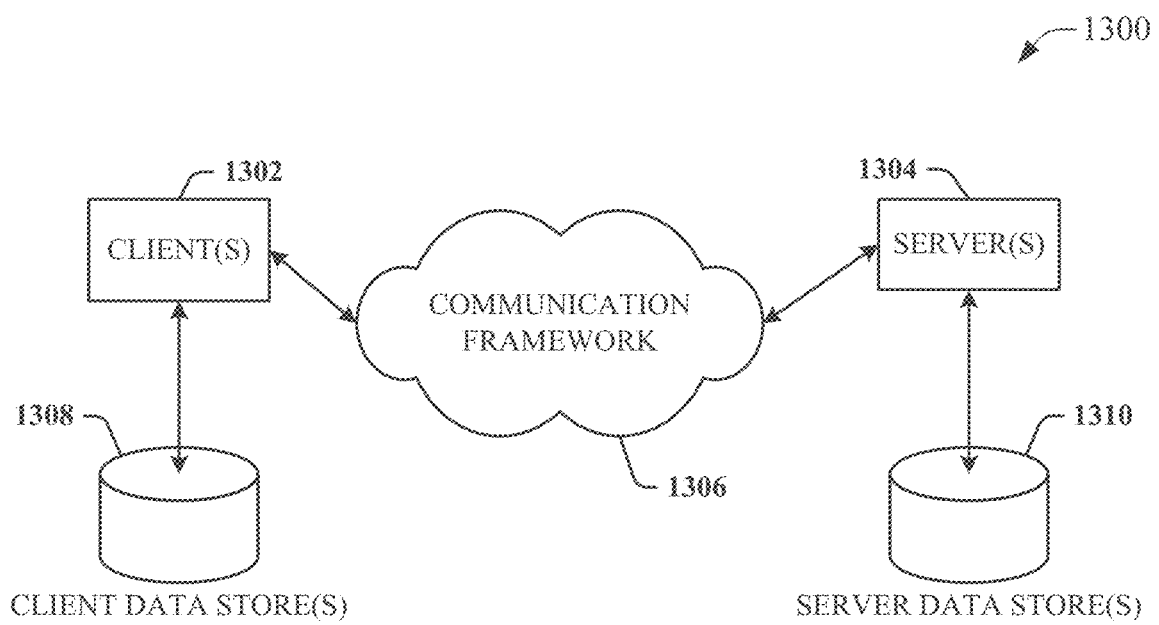
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the adapter 1256 in a wireless mode.

When used in a WAN networking environment, the computer 1202 can include a modem 1258 or can be connected to a communications server on the WAN 1254 via other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1252 or WAN 1254 e.g., by the adapter 1256 or modem 1258, respectively. Upon connecting the computer 1202 to an associated cloud storage system, the external storage interface 1226 can, with the aid of the adapter 1256 and/or modem 1258, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

Figure 14:
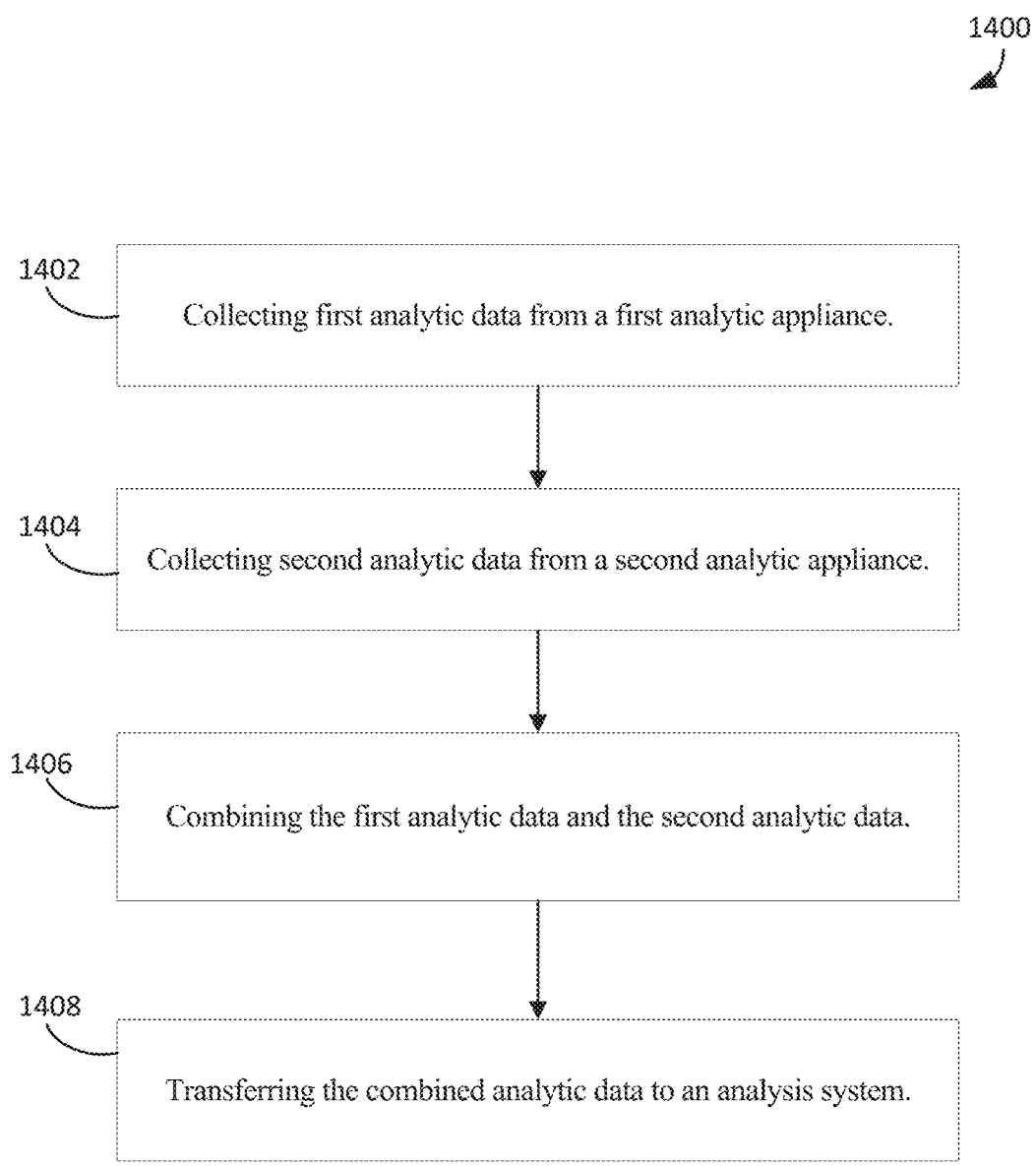
FIG. 14 is a flowchart of a method for providing scalable analytic data according to an example embodiment.

FIG. 14 is a flowchart of a method 1400 for providing scalable analytic data according to an example embodiment. At operation 1402, first analytic data is collected from a first analytic appliance by one or more processors. The first analytic data includes analytics of a first set of devices.

At operation 1404, second analytic data is collected from a second analytic appliance by the one or more processors. The second analytic data includes analytics of a second set of devices. The first set of devices and the second set of devices perform a plurality of operations in one or more industrial systems. The first analytic data and the second analytic data include raw data and/or smart data. The smart data includes one or more smart tags. Each smart tag stores a value of a data item and contextual metadata that provides additional information about the value of the data item.

At operation 1406, the first analytic data and the second analytic data are combined by one or more processors.

At operation 1408, the combined analytic data is transferred to an analysis system by one or more processors. The combining the first analytic data and the second analytic data includes contextualizing, modeling, and/or structuring the first and the second analytic data. Scalable analytic data is generated using the combined analytic data. The scalable analytic data includes real-time monitoring and analytics of each device of the first set of devices and the second set of devices.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. An industrial analytic system, comprising:
a first analytic appliance comprising circuitry configured to collect first data from a first set of industrial devices that control operation of a machine via a first network;
a second analytic appliance comprising circuitry configured to collect second data from a second set of industrial devices that control operation of the machine via the first network; and
a server comprising circuitry configured to:
collect the first data from the first analytic appliance and the second data from the second analytic appliance via a second network different from the first network;
present a user interface on a user device comprising an action card indicating an operational issue with an industrial device in the first set of industrial devices or the second set of industrial devices;
receive a user input from the user device based on an interaction with the action card on the user interface, the interaction comprising a selection of a button on the action card; and
present a solution to the operational issue with the industrial device on the user interface responsive to receiving the user input.

2. The industrial analytic system of claim 1, wherein the first data comprises raw data and smart data, the smart data comprising smart tags each comprising a value of a data item and contextual metadata that provides additional information about the value of the data item, and wherein the server is further configured to apply smart tags to the raw data.

3. The industrial analytic system of claim 1, wherein the server is further configured to discover the first analytic appliance and the second analytic appliance before collecting the first data and the second data.

4. The industrial analytic system of claim 1, wherein the server is further configured to contextualize, model, and/or structure the first data and the second data.

5. The industrial analytic system of claim 1, wherein the user input comprises a first user input, the interaction comprises a first interaction, and the button comprises a first button, and wherein the server is further configured to receive a second user input from the user device based on a second interaction with the action card on the user interface, the second interaction comprising a selection of a second button on the action card.

6. The industrial analytic system of claim 1, wherein the server is further configured to generate analytic data for the first analytic appliance and present the analytic data on the user interface, the analytic data comprising a number of industrial devices in the first set of industrial devices, a processing load for the first analytic appliance, and a memory usage for the first analytic appliance.

7. The industrial analytic system of claim 5, wherein the second button comprises a vote up button or a vote down button, and wherein the server is further configured to move the action card within an action card list on the user interface based on the second interaction.

8. The industrial analytic system of claim 7, wherein the action card list indicates a severity level associated with each action card in the action card list.

9. A method, comprising:
collecting, by one or more processors, first analytic data from a first analytic appliance, the first analytic data comprising analytics of a first set of industrial devices that control operation of a machine;
collecting, by the one or more processors, second analytic data from a second analytic appliance, the second analytic data comprising analytics of a second set of industrial devices that control operation of the machine;
combining, by the one or more processors, the first analytic data and the second analytic data;
presenting, by the one or more processors, a user interface on a user device comprising an action card indicating an operational issue with an industrial device in the first set of industrial devices or the second set of industrial devices;
receiving, by the one or more processors, a user input from the user device based on an interaction with the action card on the user interface, the interaction comprising a selection of a button on the action card; and
presenting, by the one or more processors, a solution to the operational issue with the industrial device on the user interface responsive to receiving the user input.

10. The method of claim 9, further comprising presenting, by the one or more processors, analytic data for the first analytic appliance on the user interface, wherein the analytic data comprises a number of industrial devices in the first set of industrial devices, a processing load for the first analytic appliance, and a memory usage for the first analytic appliance.

11. The method of claim 9, wherein the first analytic data and the second analytic data comprise raw data and smart data, the smart data comprising one or more smart tags each comprising a value of a data item and contextual metadata that provides additional information about the value of the data item, the method further comprising applying, by the one or more processors, smart tags to the raw data.

12. The method of claim 9, further comprising discovering, by the one or more processors, the first analytic appliance and the second analytic appliance.

13. The method of claim 9, wherein the combining the first analytic data and the second analytic data comprises contextualizing, modeling, and/or structuring the first analytic data and the second analytic data.

14. The method of claim 9, wherein the user input comprises a first user input, the interaction comprises a first interaction, and the button comprises a first button, the method further comprising receiving, by the one or more processors, a second user input from the user device based on a second interaction with the action card on the user interface, the second interaction comprising a selection of a second button on the action card.

15. The method of claim 14, wherein the second button comprises a vote up button or a vote down button, the method further comprising moving, by the one or more processors, the action card within an action card list on the user interface based on the second interaction.

16. The method of claim 15, further comprising presenting, by the one or more processors, a severity associated with each action card in the action card list on the user interface.

17. A non-transitory computer-readable medium having stored thereon instructions that, in response to execution, cause a system comprising a processor to perform operations, the operations comprising:

collecting first analytic data from a first analytic appliance, the first analytic data comprising analytics of a first set of industrial devices that control operation of a machine;

collecting second analytic data from a second analytic appliance, the second analytic data comprising analytics of a second set of industrial devices that control operation of the machine;

combining the first analytic data and the second analytic data;

presenting a user interface on a user device comprising an action card indicating an operational issue with an industrial device in the first set of industrial devices or the second set of industrial devices;

receiving a user input from the user device based on an interaction with the action card on the user interface, the interaction comprising a selection of a button on the action card; and presenting a solution to the operational issue with the industrial device on the user interface responsive to receiving the user input.

18. The non-transitory computer-readable medium of claim 17, wherein the first analytic data and the second analytic data comprise raw data and smart data, the smart data comprising one or more smart tags each comprising a value of a data item and contextual metadata that provides additional information about the value of the data item, the operations further comprising applying smart tags to the raw data.

19. The non-transitory computer-readable medium of claim 17, the operations further comprising discovering the first analytic appliance and the second analytic appliance.

20. The non-transitory computer-readable medium of claim 17, wherein combining the first analytic data and the second analytic data comprises contextualizing, modeling, and/or structuring the first analytic data and the second analytic data.

* * * * *